US012475504B2

(12) United States Patent
Morgan et al.

(10) Patent No.: US 12,475,504 B2
(45) Date of Patent: Nov. 18, 2025

(54) METHODS AND A SYSTEM OF ITEM NUTRITION INFORMATION PROCESSING

(71) Applicant: NCR Voyix Corporation, Atlanta, GA (US)

(72) Inventors: Kip Morgan, Atlanta, GA (US); Gina Torcivia Bennett, Lawrenceville, GA (US); Noah Tyler Gardner, Dacula, GA (US); Aleah Jean Kadry, Atlanta, GA (US); Kelli Lee, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 404 days.

(21) Appl. No.: 17/036,103

(22) Filed: Sep. 29, 2020

(65) Prior Publication Data

US 2022/0101413 A1    Mar. 31, 2022

(51) Int. Cl.

| G06Q 30/00 | (2023.01) |
| G06F 9/54 | (2006.01) |
| G06Q 10/087 | (2023.01) |
| G06Q 30/0207 | (2023.01) |
| G06Q 30/0601 | (2023.01) |
| G06V 30/224 | (2022.01) |

(52) U.S. Cl.
CPC ......... *G06Q 30/0635* (2013.01); *G06F 9/541* (2013.01); *G06Q 10/087* (2013.01); *G06Q 30/0239* (2013.01); *G06V 30/224* (2022.01)

(58) Field of Classification Search
CPC ............. G06Q 30/0635; G06Q 10/087; G06Q 30/0239; G06V 30/224; G06F 9/541

USPC .................................................... 705/26, 27
See application file for complete search history.

(56) References Cited

U.S. PATENT DOCUMENTS

| 8,832,016 B2* | 9/2014 | Ledlie ................... G06Q 10/10 705/64 |
| 8,873,829 B1* | 10/2014 | Tyra ..................... G06V 30/224 382/140 |
| 9,053,483 B2* | 6/2015 | Geisner ............... G02B 27/017 |
| 10,317,240 B1* | 6/2019 | Di Pietro ........... G01C 21/3694 |
| 2007/0269557 A1* | 11/2007 | Culver .............. G09B 19/0092 426/72 |
| 2009/0055199 A1* | 2/2009 | Yusuf ..................... G06Q 50/12 705/15 |
| 2010/0011020 A1* | 1/2010 | Bouzid .............. G06Q 30/0282 707/E17.046 |

(Continued)

OTHER PUBLICATIONS

Juan et al.: "An Augmented Reality App to Learn to Interpret the Nutritional Information on Labels of Real Packaged Foods," Frontiers in Computer Science, Jun. 19, 2019, 16pgs. (Year: 2019).*

*Primary Examiner* — Robert M Pond
(74) *Attorney, Agent, or Firm* — Schwegman Lundberg & Woessner, P.A.

(57) ABSTRACT

Preferences with respect nutrition and ingredients are established for a user. The preferences are managed and stored on a mobile device. Images of nutrition and ingredient information are captured and analyzed against the preferences. Any ingredient for an item associated with the images that do not conform to the preferences are flagged and the user notified. The user is provided an option to receive a substitute item that does conform with the preferences. In an embodiment, a discount is provided to the user for incentivizing the user to select the substitute item.

8 Claims, 10 Drawing Sheets

(56) References Cited

U.S. PATENT DOCUMENTS

| | | | |
|---|---|---|---|
| 2012/0005222 A1* | 1/2012 | Bhagwan | G06V 30/224 |
| | | | 707/769 |
| 2012/0136864 A1* | 5/2012 | Ochtel | G06Q 30/0633 |
| | | | 707/738 |
| 2018/0033016 A1* | 2/2018 | Mayman | G06Q 30/012 |
| 2018/0150869 A1* | 5/2018 | Finnegan | G06Q 30/0239 |
| 2018/0190375 A1* | 7/2018 | Chapela | G06N 3/0454 |
| 2019/0130448 A1* | 5/2019 | Kairinos | G06Q 30/0261 |
| 2019/0370916 A1* | 12/2019 | Surkin | H04L 67/53 |
| 2020/0152312 A1* | 5/2020 | Connor | G06V 20/20 |
| 2021/0019801 A1* | 1/2021 | Dixon | G09B 19/0092 |

* cited by examiner

METHODS AND A SYSTEM OF ITEM NUTRITION INFORMATION PROCESSING

BACKGROUND

Product/Item labels include a variety of information. Some consumers with dietary restrictions and/or dietary preferences are keenly interested in the nutritional information and ingredient information available on item packaging for items. The labels are confusing to typical consumers; this is even with strict government regulations mandating specific words and phrases that can be used, that cannot be used, and that have to be in a predefined order/structure/location on the labels, etc. Moreover, many manufacturers use intentionally deceitful language on their product labels, which may be legally compliant, but which is not helpful to discerning customers.

Furthermore, the text-font is particularly small on the labels especially for the item's ingredient listing. Reading labels is not an easy task and it takes a considerable amount of time even for sophisticated and/or nutrition-aware consumers.

Consequently, the consumers that are interested in knowing an item's nutrition and ingredient information tend to take a longer time to shop at a store. In normal situations, this would be desirable by the retailer. In fact, retailers have actively tried to develop store layouts, shelf displays/layouts, temperature and lighten settings, and promotional displays in an effort to make the in-store stays of their consumers as long as possible.

However, the COVID19 changed the goals of the retailers and has forced the retailers to handle exponential growth/demand associated with online transactions. Many shelves in the stores are now empty due to demand for specific products and the online ordering from customers that are concerned with visiting the stores in person out of fear of exposing themselves to COVID19. Furthermore, some states have mandated customer capacity limits, which restrict how many customers can be in a store at a time. Some stores now have lines waiting to enter the stores due to the capacity limits. Furthermore, stores are being asked to enforce social distances of their customers within the store.

As a result, the goals of the retailers during this pandemic are now the exact opposite of what they were before the pandemic. Now, retailers desire to limit the in-store visit times of their customers in order to limit the potential exposure time to COVID19.

Also, consumers with dietary restrictions and concerns find it difficult to find alternative produces when initially selected items do not conform to their restrictions/concerns. COVID19 has exacerbated these issues for both the retailer and the consumers (who do not like being in the store any longer than is necessary).

SUMMARY

In various embodiments, methods and a system for item nutrition information processing are presented.

According to an embodiment, a method for item nutrition information processing is provided. For example, at least one image is received representing nutrition and ingredient information for an item. Preferences associated with nutrition and ingredient constraints are obtained. A determination is made as to whether the nutrition and ingredient information for the item conforms or satisfies the preferences. Non-conforming ingredients or non-conforming nutrition data identified from the nutrition and ingredient information that did not conform to the preferences are provided as a response to receiving the at least one image and obtaining the preferences.

DETAILED DESCRIPTION

Figure 1A:
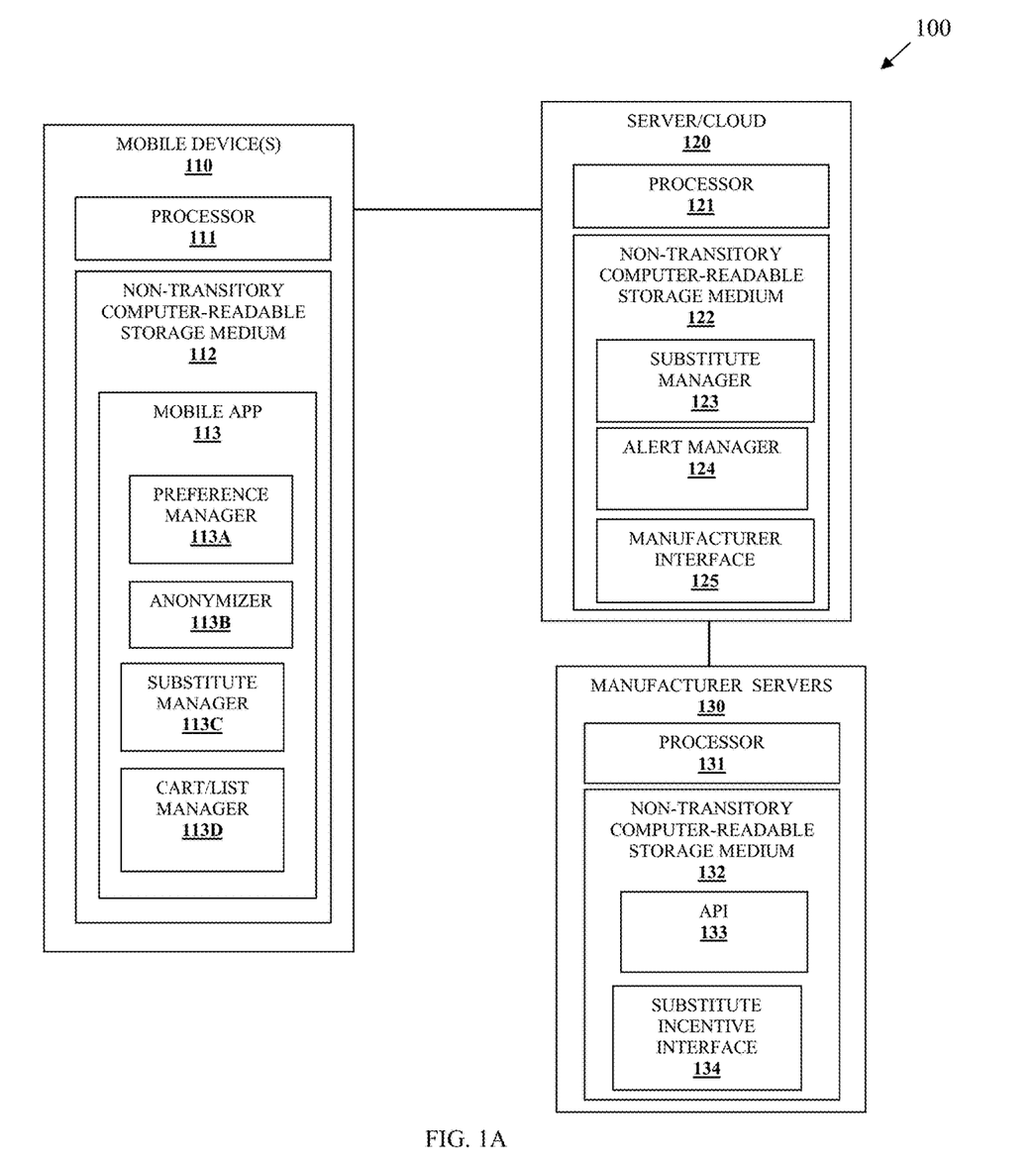
FIG. 1A is a diagram of a system for item nutrition information processing, according to an example embodiment.

FIG. 1A is a diagram of a system 100 for nutrition information processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of nutrition information processing, presented herein and below.

As will be discussed herein and below, methods and a system are provided for quickly and efficiently identifying nutritional or ingredient concerns of a consumer, highlighting a specific ingredient or nutritional value that is a concern to the consumer, and automatically providing a suggested replacement item that does conform to the consumer's dietary restrictions or concerns. Furthermore, system 110 removes a need for consumers to have to manually read nutritional and ingredient information from item/product labels, removes the likelihood that the consumer is duped into buying an item with deceitful language, quickly provides alternative items when a given item is nutritionally problematic to the consumers, allows unsophisticated and novice consumers to easily engage more nutritional conscious purchasing, allows manufacturers to actively market substitute products, and allows retailers to obtain products that conform to their customers.

System 100 includes a mobile device 110, a server/cloud 120, and a plurality of manufacturer servers 130.

Mobile device 110 comprises a processor 111 and a non-transitory computer-readable storage medium 112. Medium 112 comprises executable instructions for a mobile application (app) 113. Mobile app 113 further comprising executable instructions for operations of a preference manager 113A, an anonymizer 113B, a substitute manager 113C, and a cart/list manager 113F.

Server/Cloud 120 comprises a processor 121 and a non-transitory computer-readable storage medium 122. Medium 122 comprises executable instructions for a substitute manager 123, an alert manager 124, and a manufacturer interface 124.

Each manufacturer server 130 comprises a processor 131 and a non-transitory computer-readable storage medium 132. Medium 132 comprises executable instructions for an Application Programming Interface (API) 133 and a substitute incentive interface 134.

Each corresponding processor of each corresponding device obtains the corresponding executable instructions from the corresponding mediums, which causes the corresponding processor to perform operations described herein and below for 113 (113A-113D), 123-125, and 133-134.

Initially, a user/consumer obtains app 113 from an app store or from server 120.

When app 113 is initiated on mobile device 110, a user-facing interface of app 113 may, optionally, register the mobile device (via mobile device identifier) and via an account setup with server 120. It is noted that any account setup is independent of any accounts that the user/consumer may independently have with any retailers or manufactures.

In an embodiment, the user performs no registration and the no mobile device identifier provided by app 113; rather, each interaction between app 113 and server 120 is anonymous and the identity of the user is unknown to server 120.

Figure 1B:
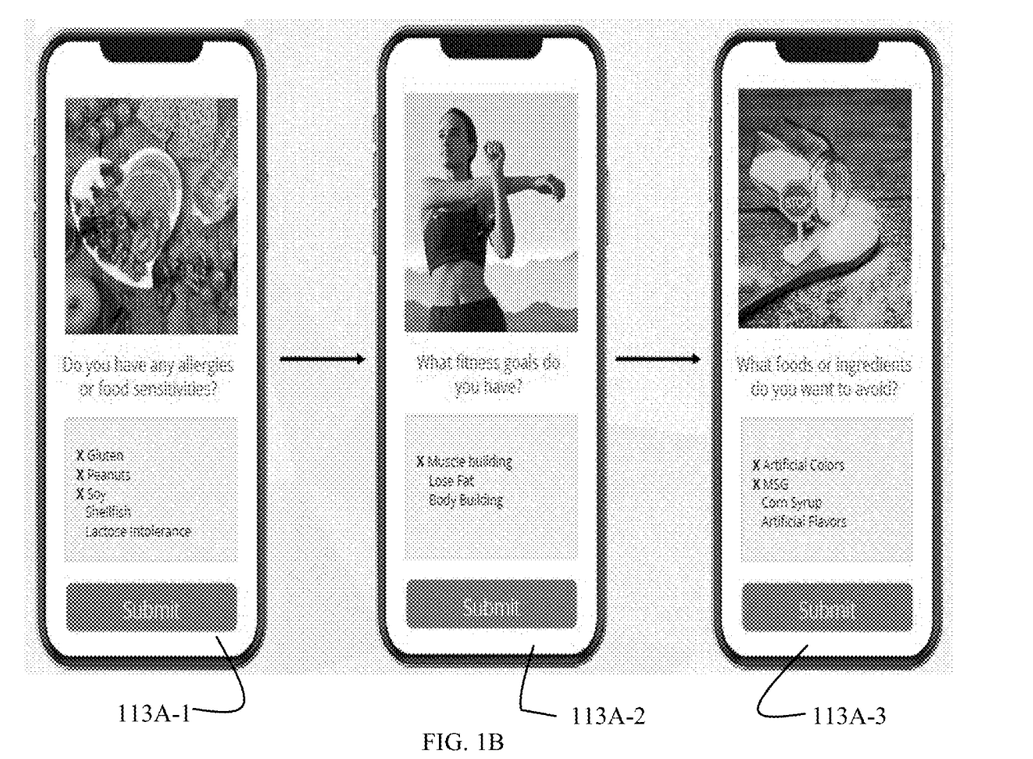
FIG. 1B is a diagram of example nutrition profile screens generated by a mobile device for an example item, according to an example embodiment.

After any registration or non-registration and upon first use of app 113, preference manager 113A generates a plurality of nutritional preference screens (example screens 113A-1, 113A-2, 113A-3) for receiving input representing nutritional restrictions/concerns of the user/consumer.

FIG. 1B is a diagram of example nutrition profile screens (113A-1, 113A-2, 113A-3) generated by preference manager 113A of mobile device 113, according to an example embodiment.

Screen 113A-1 presents commonly known allergies for selection by the user/consumer. Less common allergies may be searched through a search screen for selection. The user/consumer makes all the appropriate selections for the user. It is noted that the screen 113A-1 may scroll or may entail sub-screens that preference manager 113A may need to generate and render on the display of mobile device 110 to ensure that all of the selected or entered allergies are received from the user.

After allergies are identified by preference manager 113A, preference manager 113A transitions to any fitness goals that the user may have and may like to monitor. This is shown in screen 113A-2 and includes, by way of example only, muscle building, lose fat, body building, etc.

After fitness goals are identified by preference manager 113A, preference manager 113A transitions to any specific food or food ingredient that the user wants or needs to avoid. This is shown in screen 113A-3 and includes, by way of example only, artificial colors, MSG, corn syrup, artificial flavors, etc. It is noted, that this may also include categories associated with the eating habits of the user, such as a user that is vegetarian and/or vegan—in which case all known ingredients associated with meat or derived from animals (vegan) are listed automatically for the user as food or ingredients to avoid.

Preference manager 113A engages in an interactive profile or preference session with the user for obtaining all the user desired restrictions with respect to food, ingredients, and fitness. Preference manager 113A generates the corresponding session screens in accordance with a questionnaire, which may be provided and periodically updated from server 120 by substitute manager 123. Thus, it is to be noted that more or less screens and modified screens with configured questions can be generated by preference manager 113A from that which is illustrated in FIG. 1B.

Preference manager 113A may also record subsequently selected preferred substitutes for a specific type of item or ingredient when multiple substitutes are available within the user's preferences/profile. A list of items or ingredients may be provided by the user that are blacklisted and/or whitelisted by the user for recordation within the preferences/profile as well.

Answers received by preference manager 113A during the profile or preference session are recorded and noted as preferences or a profile for the user. The preference or profile are stored locally on the mobile device 110 and not shared with any user-specific identifying information to server 120 nor shared with any user-specific identifying information to manufacturer servers 130. This maintains the privacy of the user.

In an embodiment, the user may be asked for permission to share the profile with server 120 and/or manufacturer servers 130 with user-identifying information. But, by default this profile is not shared with any user-specific identifying information and is maintained and managed from and on mobile device 110.

When the profile is provided to substitute manager 123 it is anonymized by anonymizer 113B before being sent to substitute manager 123. That is, any customer-identifying data is removed and masked (user identifier, mobile device identifier, etc.) when preference manager 113A provides the profile to substitute manager 123. This allows manager 123 to globally accumulate profiles anonymously and develop dietary preferences or trends by specific regions (location data may be provided with the anonymized profile, such that the profiles can be aggregated and analyzed anonymously by region).

When the user is shopping or has an item at home that was purchased and is in the possession of the user, the user activates app 113 and indicates through the user-facing interface that the user wants to check an item. In an embodiment, the user-facing interface may allow the user to scan the barcode or enter an item name for the item. A camera is activated by app 113 and substitute manager 113C guides the user through capturing a quality image of the nutrition and ingredient information together as a single image or captures two separate images one for the nutrition information and one for the ingredient information. In some cases, three images are captured, one for the item as a whole or the item barcode, one for the nutrition information, and one for the ingredient information assuming the nutrition and ingredient information cannot be captured together in a single image from the camera of mobile device 110. The user may also just capture a single image for just nutrition or just ingredients, or one image that includes both the nutrition and ingredient information.

Once a quality image or set of images are obtained, anonymizer 113B obtains and anonymizes the profile/preferences from the encrypted data store/base of mobile device 110, and substitute manager 113C sends the image or images and the anonymized profile/features to substitute manager 123 of server 120.

Substitute manager 123 provides the image(s) to and the profile/features to alert manager 124. Alert manager 124 performs Optical Character Recognition (OCR) on the image(s) obtains the text output and compares the text output against the preferences/profile. Furthermore, each ingredient word/phrase may be expanded during the comparison to include a plurality of other words known to be associated with that particular ingredient word/phrase from a server-maintained database (similar to thesaurus but specific to ingredients—to avoid any deceitful ingredient names, which may be used by item manufactures). If one or more offending ingredient words/phrases are found in the OCRed text of the image(s) that match the anonymous preferences/profile, then alert manager 124 produces a modified image that highlights the offending ingredients and provides the modified image back to substitute manager 123. Substitute manager 123 provides the modified image back to substitute manager 113C, which causes the modified image to be displayed through the user-facing interface of app 113 to the user. An option is provided through the user-facing interface for the user to select that requests a substitute item that conforms to the user's preferences/profile. If the user has already identified a substitute item in a whitelist for the item scanned, substitute manager 113C may provide the substitute item upon selection of the option, since the profile/preferences are maintained and managed locally on mobile device 110.

If the user has not recorded a preferred substitute item in the user's preferences, when the user selected the substitute item option from the user-facing interface, substitute manager 113C sends a request to provide a substitute item recommendation to substitute manager 123. Substitute manager 123 searches a server-maintained database for a substitute that excludes the offending ingredients and returns an image of the substitute item and its nutritional and ingredient information to substitute manager 113C, which is then presented to the user within the user-facing interface. This processing can iterate if the user wants a different substitute item; alternatively, a priority based list of alternative items may be provided to substitute manager 113C from substitute manager 123 when the first substitute item was provided (with substitute manager 113C sequentially presenting the substitute item images and corresponding nutritional and ingredient information each time the user selects provide another substitute option).

Any selected substitute item for the original item may then be used by substitute manager 113C to ask the user if the user wants to retain that substitute item as a replacement for the original item. Should the user answer in the affirmative, preference manager 113A updates the user's preferences/profile.

Separate from the processing discussed above, manufacturers associated with manufacturer servers 130 may use substitute incentive interface 134 to scan item and ingredients that are known to be undesirable to customers and provide substitute items and ingredients. These substitutions are maintained in the server-maintained database by manufacturer interface 125. The substitute incentive interface 134 may also be operated by a manufacturer, retailer, or distributor to provide coupons or other incentives should a customer select that manufacturer's substitute item; these incentives are also maintained in server-maintained database by manufacturer interface 125.

In an embodiment, real-time requests for substitute items and ingredients can be made from substitute manager 123 to API 133 and manufacturer can provide a real-time substitute item and ingredient for a specific offending item and ingredient back to substitute manager 123 (this may also include an image of the item with the ingredient and nutritional information and any manufacturer-provided incentive.

It is to be noted that "manufacturer" as used herein can include a food item "distributor" or a food item "retailer," such that the substitute items are marketed by manufacturers, distributors, or retailers through substitute incentive interface 134 and its interaction with manufacturer interface 125 and/or through API 133 with substitute manager 123.

In an embodiment, provider of substitute manager 123 charges subscription or fees of the manufacturers for providing substitute items and ingredients. The fees can be subscription based, based on selected items by customers for purchase, or combinations of these or other conditions.

In an embodiment, when coupons are provided for substitute items and ingredients, the image of the coupon can be included with the image of the substitute item or ingredient by substitute manager 123 to substitute manager 113C or a link can be provided that when activated by the user through the user-facing interface of app 113 directly obtains the coupon image from the manufacturer's site.

In an embodiment, substitute manager 123 maintains the server-controlled database with a variety of linked information, such as ingredients linked to preferences (anonymized preferences), sets of ingredients linked to specific items, specific items linked to substitute items provided by a manufacturer along with the corresponding ingredients for such substitute items, coupons or incentives for purchasing a given substitute item as an incentive by a particular manufacturer (this may be stored as a link to the manufacturer's site where the coupon can be directed obtained, etc.

In an embodiment, substitute manager 123 hashes a list of provided ingredients and uses a resulting hash value to locate a specific item associated with the ingredients within the server-controlled database.

In an embodiment, app 113 is integrated into an existing mobile scanning and shopping application of a retailers, such that the features discussed above are accessible to the user while self-shopping within a store. The shopping application may also support online shopping for subsequent pickup by the user or delivery to a user designated location.

A variety of variations to the above-discussed processing can occur. For example, the user may operate app 113 while forming a grocery or shopping list or may be asked each time an item is scanned whether or not the user desires to add it to his/her shopping list. Cart/List manager 113D retains such a list for the user on mobile device 110. For example, the app 113 may be used by the user after the user returns from the store with items, the user then scans the items to determine if the items conform to the user's preferences or profile and based on this forms a shopping list having the substitute items. As discussed above, the user may also interact with preference manager 113A to add substitute items and preferred substitutes for a given item or ingredient.

Figure 1C:
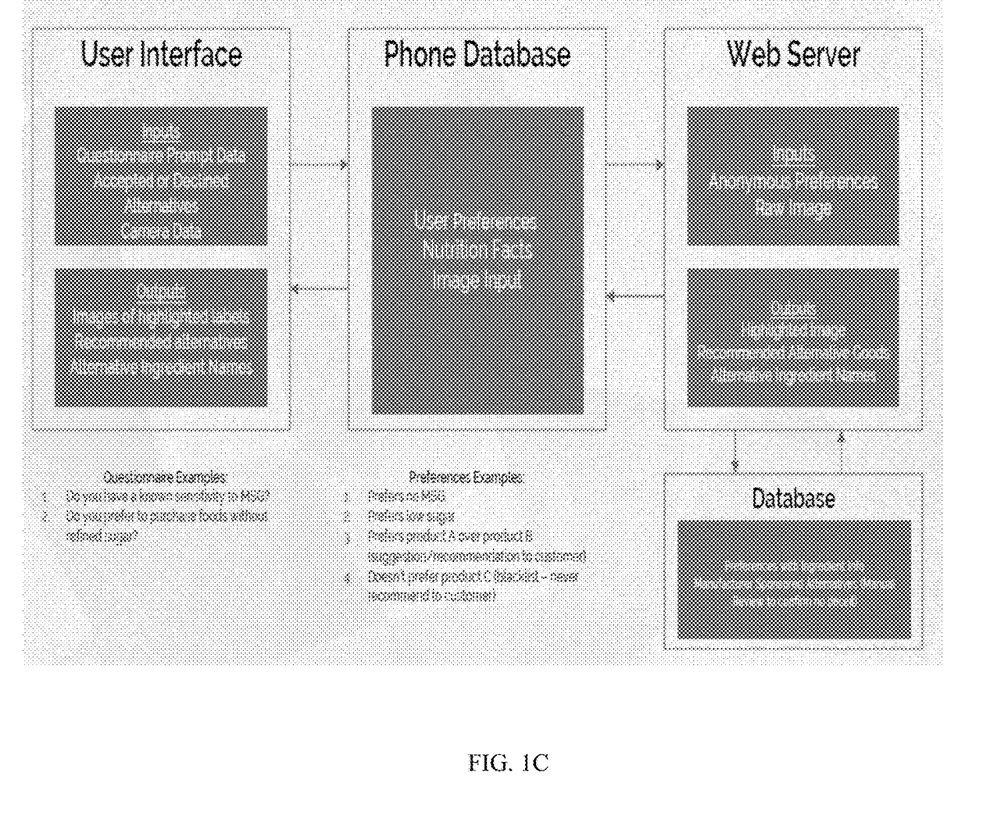
FIG. 1C is a diagram of a process flow and data processed by components of the system from FIG. 1A, according to an example embodiment.

FIG. 1C is a diagram of one example process flow and data processed by components of the system from FIG. 1A, according to an example embodiment.

FIG. 1C illustrates input data provided from the user-facing interface of app 113 and output data displayed through the user-facing interface of app 113. The app 113 may maintain an encrypted database that stores the user's profile/preferences, nutrition facts (including ingredients), images retained by user for specific items, preferences for substitute items when presented specific items (Prefers product A over product B), blacklisted items, whitelisted items, etc.

The inputted data provided to app 113 includes the information or selections entered during the profile session with preference manager 113A (answers to the questionnaire through prompted data and acceptances or declinations made by the user). Alternative food items, fitness data, and images captured by a camera of mobile device 110.

Substitute manager 123 receives as input from substitute manager 113C of mobile device 110 anonymous preferences for the user and raw images of nutrition and ingredient labels captured by a camera of mobile device 110 during operation by the user. Substitute manager 123 produces as output highlighted images that highlight ingredients or nutrition information that does not comport with the provided anonymous preferences/profile, and alternative item ingredients or items that can be substituted for a problematic item associated with the modified image provided by substitute manager 113C.

Server-controlled database may include a variety of information maintained by substitute manager 123 and manufacturer interface 125, such as what was discussed above and as illustrated in FIG. 1C.

Figure 1D:
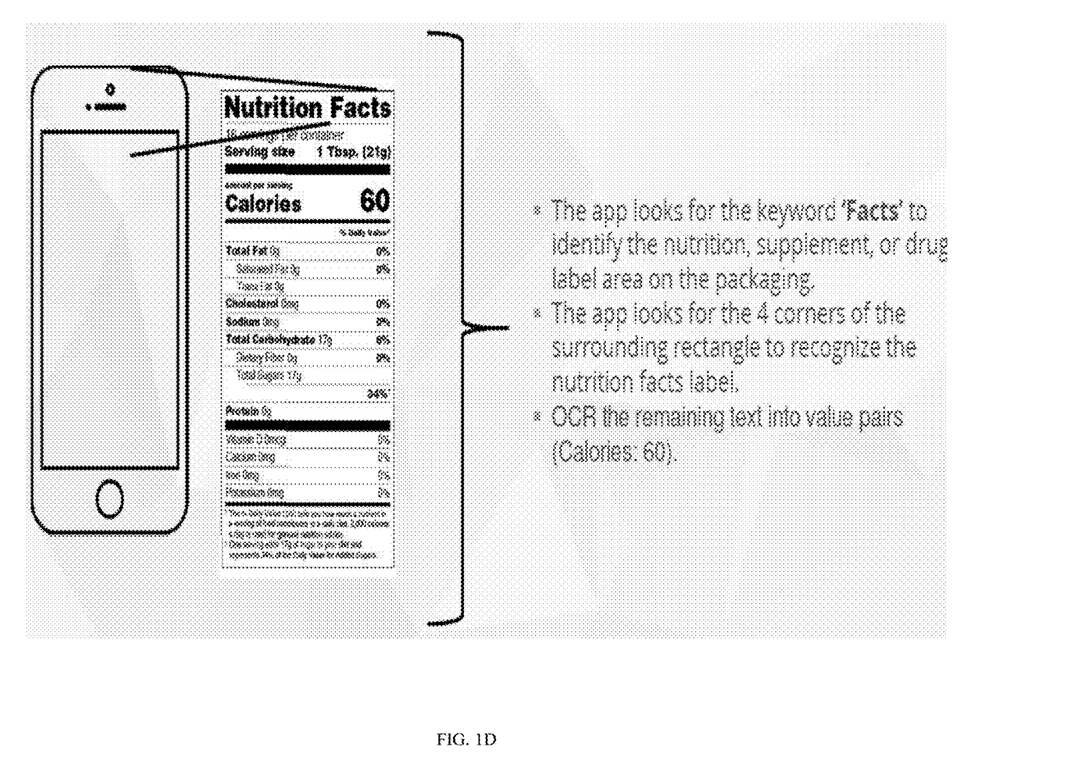
FIG. 1D is a diagram that depicts capturing, by a mobile device, of an example nutrition label on an example item, according to an example embodiment.

FIG. 1D is a diagram that depicts capturing, by a mobile device, of an example nutrition label on an example item, according to an example embodiment.

Mobile device 120 includes an integrated camera for capturing images of barcodes, nutrition information, ingredient information, and/or an item/product as a whole. Substitute manager 113C interacts with camera and actively looks for facts that identify nutrition, supplements, or drug label area on the packaging. Substitute manager 113C actively looks for the 4 corners of a surrounding rectangle to recognize the nutrition facts label. Once this is identified and centered within app-displayed guides on the user-facing interface of app 113, an image is captured automatically by substitute manager 113C or substitute manager 113C captures the image after the user depresses a capture button option presented within the user-facing interface.

Figure 1E:
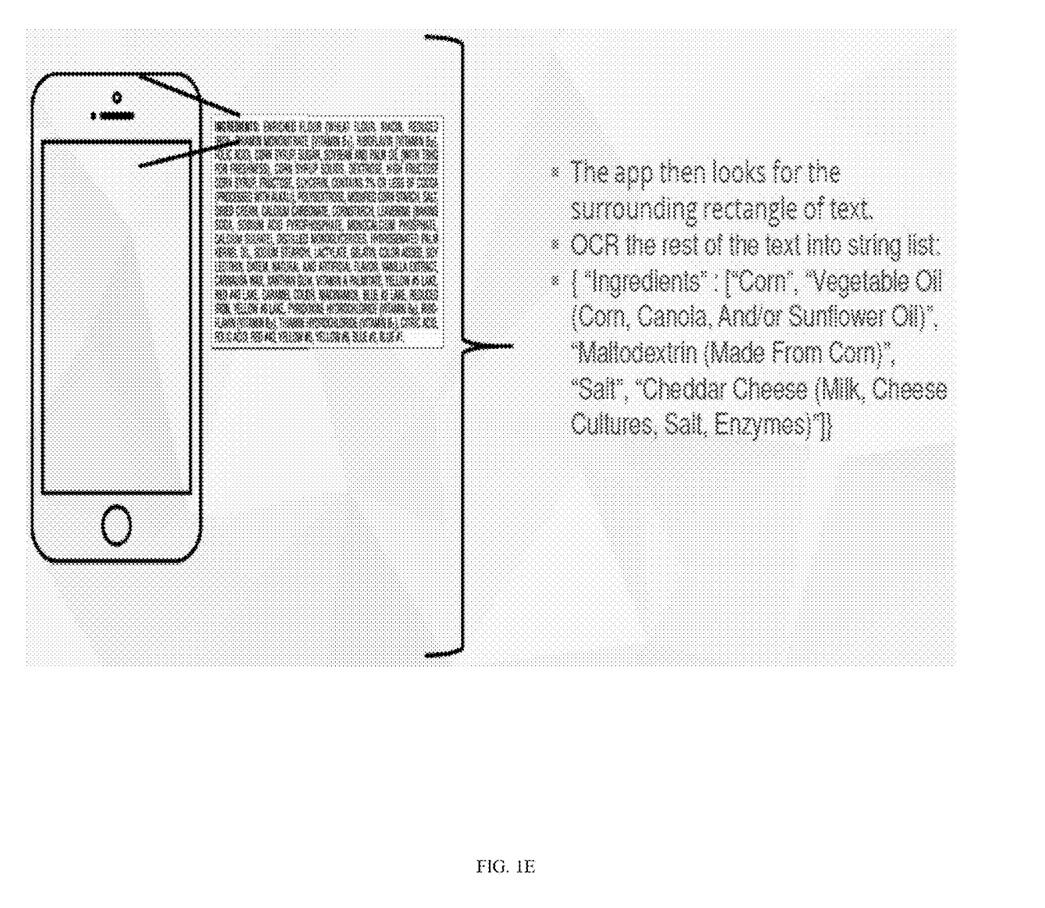
FIG. 1E is a diagram that depicts capturing, by a mobile device, of an example ingredient label on an example item, according to an example embodiment.

FIG. 1E is a diagram that depicts capturing, by a mobile device, of an ingredient label on an example item, according to an example embodiment.

Similar to what was discussed with FIG. 1D, once the camera is activated, substitute manager 113C interacts with the camera for the ingredient information. When the surrounding rectangle is identified by substitute manager 113C, an ingredient image is captured automatically or after the user activates a capture button option within the user-facing interface.

Figure 1F:
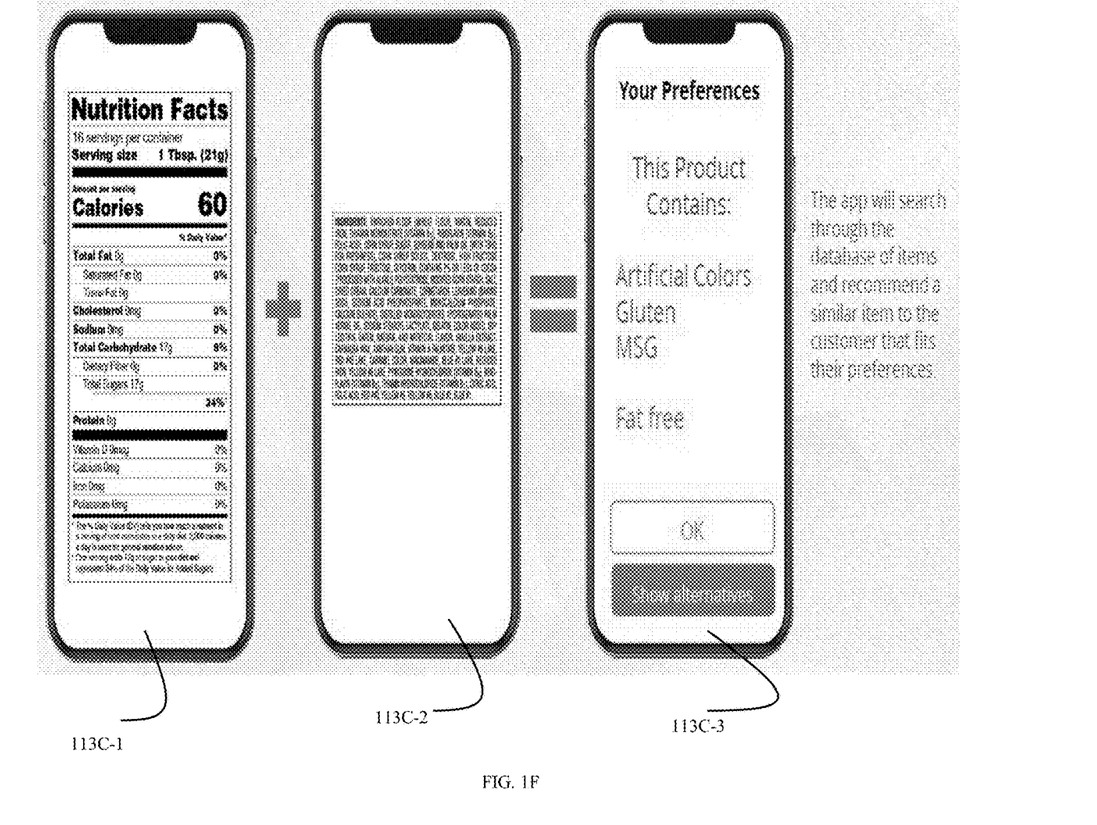
FIG. 1F is a diagram of example nutrition capture and analysis screens generated by a mobile device, according to an example embodiment.

FIG. 1F is a diagram of example nutrition capture and analysis screens generated by a mobile device, according to an example embodiment.

After the nutrition label and ingredient label are captured by the user through the camera of mobile device 110, substitute manager 113C generates screens 113C-1 and 113C-2 for viewing by the user before submission to substitute manager 123 of server 120. After substitute manager 123 of server 120 performs OCR and comparison against the provided anonymized preferences of the user with alert manager 124 and the modified image with highlights and information are received by substitute manager 123, the non-conforming ingredients of the item and the modified image(s) are sent from substitute manager 123 to substitute manager 113C. Substitute manager 113C then renders screen 113C-3. As noted above, substitute manager 113C may also provide one or more rendered screen showing the nutrition and ingredients highlighted within the modified image(s) to the user through the user-facing interface.

Figure 1G:
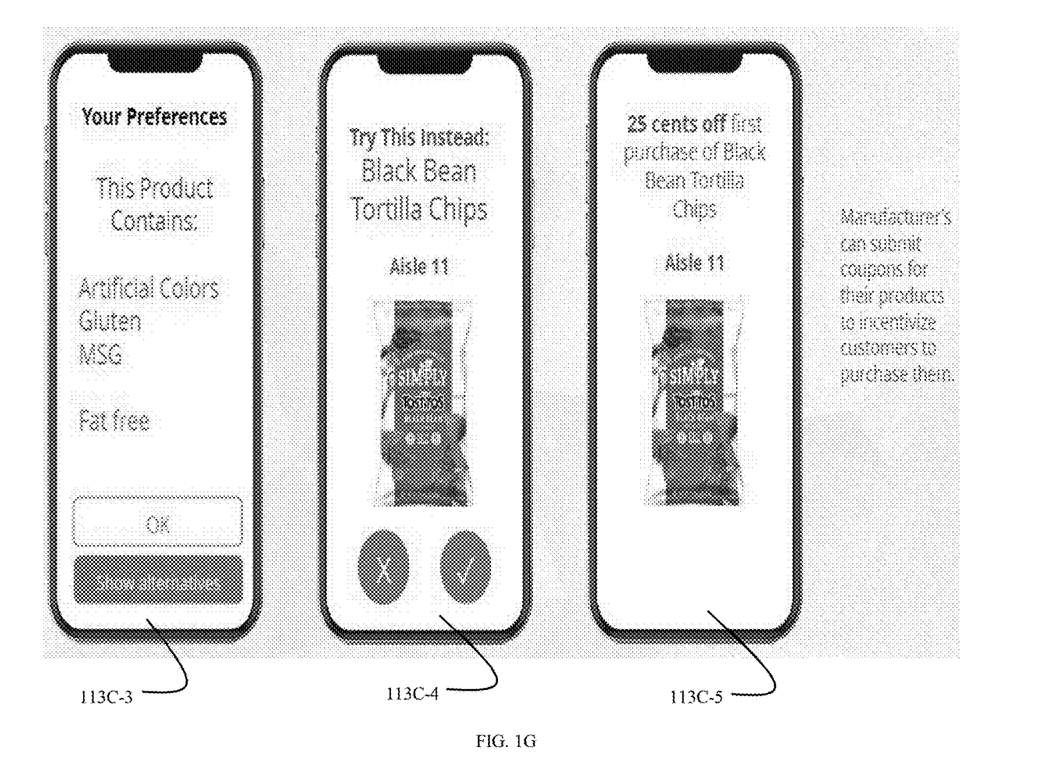
FIG. 1G is a diagram of example nutrition analysis and item substitution screens generated by a mobile device, according to an example embodiment.

FIG. 1G is a diagram of example nutrition analysis and item substitution screens generated by a mobile device, according to an example embodiment.

FIG. 1G illustrates screen 113C-3 similar to what was shown and discussed in FIG. 1F and the related discussion above. FIG. 1G assumes that the user selects the show alternatives option from screen 113C for purposes of seeing in real time an alternative or a substitute item/product.

Substitute manager 123 uses the server-controlled database to identify a manufactured supplied alternative and returns to substitute manager 113C. This causes substitute manager 113C to render screen 113C-4 depicting an image of the substitute product with a x option or a checkmark option (x means no interest by the user and checkmark indicating that the user is interested in the substitute product). Assuming, the manufacturer linked a coupon to the substitute product, substitute manager 113C generates screen 113C-5 presenting the discount or incentive to the user.

Furthermore, if the user is operating mobile device 120 within a specific store, the location information of device 120 provided by substitute manager 113C to substitute manager 123 allows substitute manager to identify the store location of the user (even though the user may still remain anonymous to server 120). The server-controlled database may further include specific store location planograms, which substitute manager 123 can process to locate a location (aisle 11 in FIG. 1G) and provide this in-store location information for the substitute product back to substitute manager 113C, which allows substitute manager 113C to render screens 113C-4 and 113C-5 with the in-store location information.

Figure 1H:
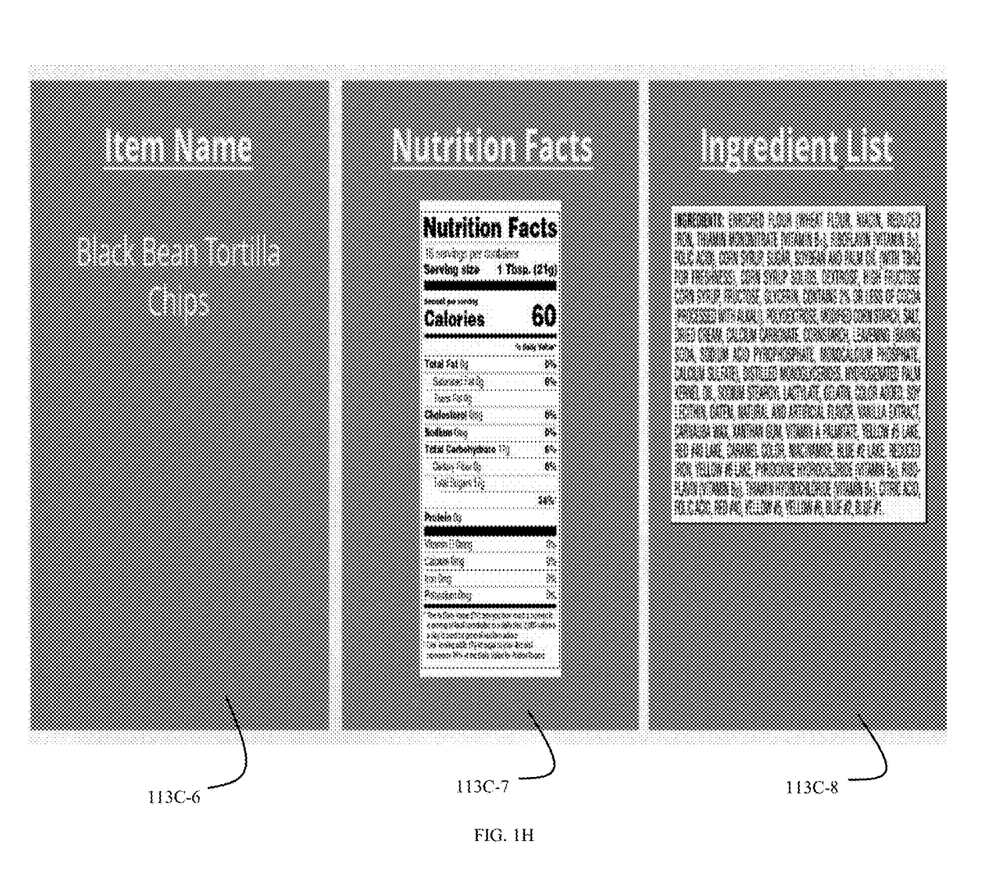
FIG. 1H is a diagram of example item, nutrition data, and ingredients data identified and processed by the system of FIG. 1, according to an example embodiment.

FIG. 1H is a diagram of example item, nutrition data, and ingredients data identified and processed by the system of FIG. 1, according to an example embodiment.

FIG. 1H illustrates additional screens, which may be rendered by substitute manager 113C within the user-facing interface of app 113 for the selected substitute item discussed above in FIG. 1G. Here, screen 113C-6 shows the name of the substitute item, screen 113C-7 shows the nutrition information for the substitute item, and screen 113C-8 shows the ingredient information for the substitute item.

In an embodiment, mobile device 110 is a phone, a tablet, a laptop, or a wearable processing device.

In an embodiment, server 120 is one of multiple servers that logically cooperated as a cloud processing environment (cloud). The cloud delivering in real time substitute item information based on interactions with mobile device 110 via the cloud.

Figure 2:
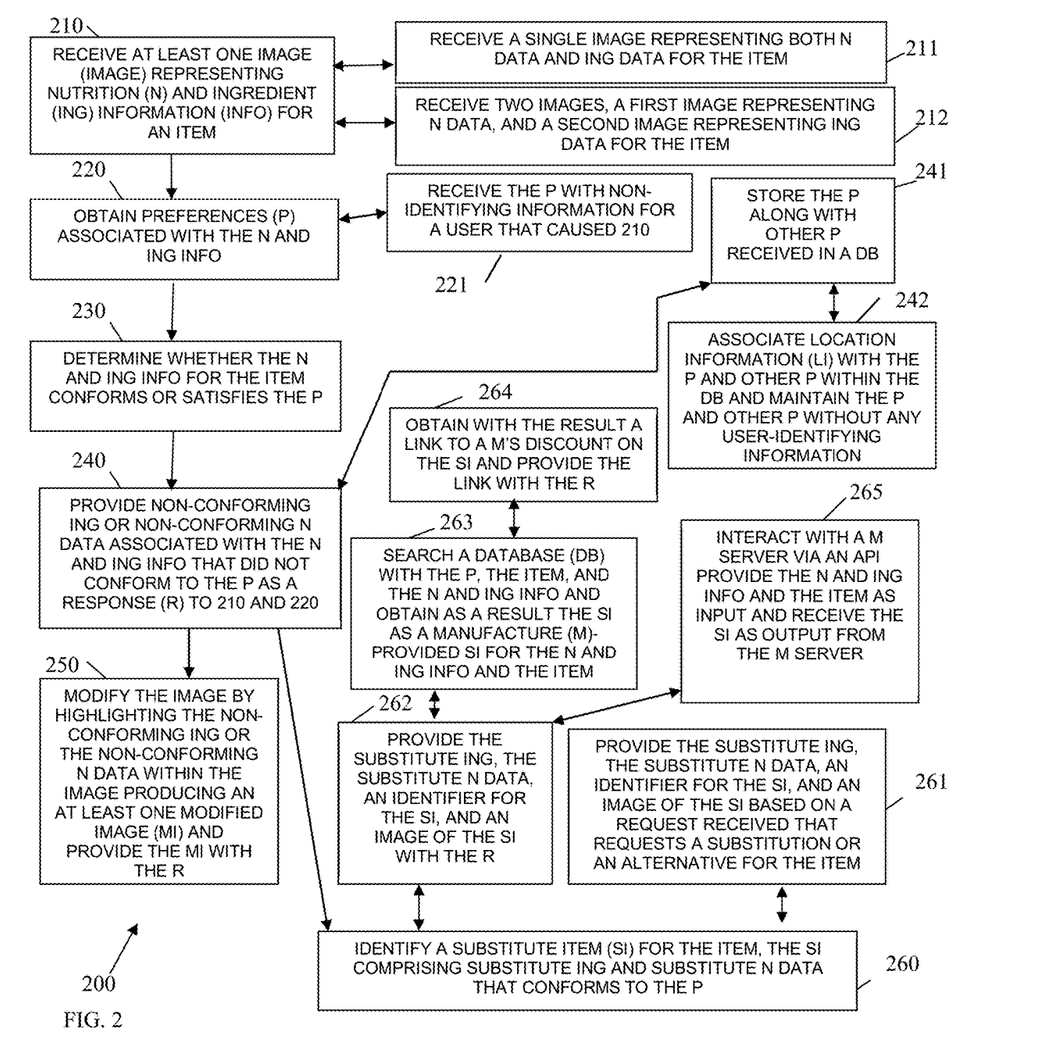
FIG. 2 is a diagram of a method for nutrition information processing, according to an example embodiment.

The above-noted embodiments and other embodiments are now discussed with FIG. 2.

FIG. 2 is a diagram of a method 200 for nutrition information processing, according to an example embodiment. The software module(s) that implements the method 200 is referred to as a "nutrition service manager." The nutrition service manager is implemented as executable instructions programmed and residing within memory and/or a non-transitory computer-readable (processor-readable) storage medium and executed by one or more processors of a server. The processor(s) of the device that executes the nutrition service manager are specifically configured and programmed to process the nutrition service manager. The nutrition service manager may have access to one or more network connections during its processing. The network connections can be wired, wireless, or a combination of wired and wireless.

In an embodiment, the nutrition service manager executes on server 120. In an embodiment, server 120 is a one of many servers that logically cooperate from a cloud processing environment.

In an embodiment, the nutrition service manager is all or some combination of substitute manager 123, alert manager 124, and manufacturer interface 125.

At 210, the nutrition service manager receives at least one image representing nutrition and ingredient information for an item.

In an embodiment, at 211, the nutrition service manager receives a single image representing both nutrition data and ingredient data for the item.

In an embodiment, at 212, the nutrition service manager receives two images. The first image representing nutrition data for the item and the second image representing ingredient data for the item.

At 220, the nutrition service manager obtains preferences associated with the nutrition and ingredient information.

In an embodiment, at 221, the nutrition service manager receives the preferences with non-identifying information for a user that caused at least one image to be received at 210 (through interaction with app 113).

At 230, the nutrition service manager determines whether the nutrition and ingredient information for the item conforms or satisfies the preferences.

At 240, the nutrition service manager provides non-conforming ingredient data or non-conforming nutrition data associated with the nutrition and ingredient information that did not conform to the preferences as a response to 210 and 220.

In an embodiment, at 241, the nutrition service manager stores the preferences along with other preferences in a database.

In an embodiment of 241 and at 242, the nutrition service manager associates location information with the preferences and the other preferences within the database and the nutrition service manager maintains the preferences and the other preferences without any user-identifying information within the database.

In an embodiment, at 250, the nutrition service manager modifies the at least one image by highlighting the non-conforming ingredient data or the non-conforming nutrient data within the at least one image, producing at least one modified image. The nutrition service manager provides the modified image(s) with the response.

In an embodiment, at 260, the nutrition service manager identifies a substitute item for the item. The substitute item comprising substitute ingredient data and substitute nutrition data that conforms to the preferences.

In an embodiment, at 261, the nutrition service manager provides the substitute ingredient data, the substitute nutrition data, and identifier for the substitute item, and a substitute image for the substitute item based on a request received that requests a substitution or an alternative for the item.

In an embodiment, at 262, the nutrition service manager provides substitute ingredient data, the substitute nutrition data, an identifier for the substitute item, and a substitute image of the substitute item with the response.

In an embodiment of 262 and at 263, the nutrition service manager searches a database with the preferences, the item, and the nutrition and ingredient information and obtains as a result the substitute item as a manufacturer-provided substitute item for the nutrition and ingredient information and the item.

In an embodiment of 263 and at 264, the nutrition service manager obtains with the result a link to a manufacturer discount on the substitute item and provides the link with the response.

In an embodiment of 262 and at 265, the nutrition service manager interacts with a manufacturer server via an API and provides the nutrition and ingredient information and the item as input. The nutrition service manager receives the substitute item as output from the manufacturer server.

Figure 3:
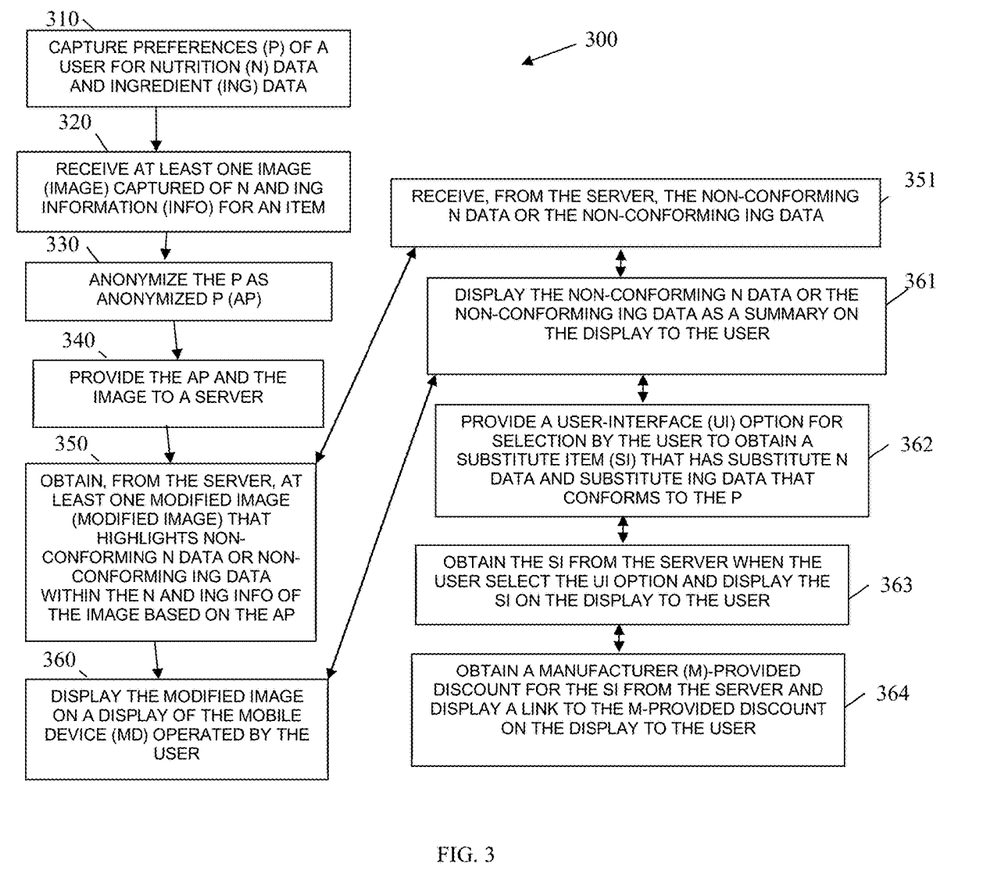
FIG. 3 is a diagram of another method for nutrition information processing, according to an example embodiment.

FIG. 3 is a diagram of a method 300 for nutrition information processing, according to an example embodiment. The software module(s) that implements the method 300 is referred to as a "nutrition mobile app." The nutrition mobile app is implemented as executable instructions programmed and residing within memory and/or a non-transitory computer-readable (processor-readable) storage medium and executed by one or more processors of a mobile device. The processor(s) of the device that executes the nutrition mobile app are specifically configured and programmed to process the nutrition mobile app. The nutrition mobile app may have access to one or more network connections during its processing. The network connections can be wired, wireless, or a combination of wired and wireless.

In an embodiment, the mobile device that executes the nutrition mobile app is mobile device 110. In an embodiment, the mobile device 110 is a phone, a tablet, a laptop, or a wearable processing device.

In an embodiment, the nutrition mobile app is app 113 comprising preference manager 113A, anonymizer 113B, substitute manager 113C, and/or cart/list manager 113D.

Nutrition mobile app interacts with substitute manager 123 and/or method 200 over a network.

At 310, the nutrition mobile app captures preferences of a user for nutrition data and ingredient data.

At 320, the nutrition mobile app receives at least one image captured of nutrition and ingredient information for an item.

At 330, the nutrition mobile app anonymizes the preferences as anonymized preferences.

At 340, the nutrition mobile app provides the anonymized preferences and the image to a server.

At 350, the nutrition mobile app obtains, from the server, at least one modified image that highlights non-conforming nutrition data or non-conforming ingredient data within the nutrition and ingredient information of the image based on the anonymized preferences.

In an embodiment, at 351, the nutrition mobile app receives, from the server, the non-conforming nutrition data or the non-conforming ingredient data.

At 360, the nutrition mobile app displays at least one modified image on a display of the mobile device (operated by the user).

In an embodiment of 351 and 360, at 361, the nutrition mobile app displays the non-conforming nutrition data or the non-conforming ingredient data as a summary on the display to the user.

In an embodiment of 361 and at 362, the nutrition mobile app provides a UI option for selection by the user to obtain a substitute item that has substitute nutrition data and substitute ingredient data that conforms to the preferences.

In an embodiment of 362 and at 363, the nutrition mobile app obtains the substitute item from the server when the user selects the UI option and the nutrition mobile app displays the substitute item on the display to the user.

In an embodiment of 363 and at 364, the nutrition mobile app obtains a manufacturer-provided discount for the substitute item from the server and the nutrition mobile app displays a link to the manufacturer-provided discount on the display to the user.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    capturing preferences of a user as nutrition data and ingredient data;
    receiving at least one image captured of nutrition and ingredient information for an item, wherein receiving further includes:
        receiving a barcode scanned from the item from a mobile device operated by the user and instructing the user to operate a camera of the mobile device while guiding the user to capture at least one quality image of the at least one image of the nutrition and ingredient information; and
        identifying when the nutrition and ingredient information is centered within guides displayed on a user interface of the mobile device before capturing of wherein the at least one quality image is captured automatically or after user activation of a capture button option presented within a user interface of the mobile device responsive to the nutrition and ingredient information being centered within guides displayed on the user interface;
    anonymizing the preferences as anonymized preferences, wherein anonymizing further includes storing the preferences on the mobile device in an encrypted format;
    providing the anonymized preferences and the at least one image to a server, wherein an identity of the user is unknown and not maintained with the anonymized preferences, and wherein the server is configured to perform enhanced real-time processing to generate at least one modified image of the at least one image, wherein the at least one modified image represents modifications highlight non-conforming nutrition data or non-conforming ingredient data within the nutrition and ingredient information based on the anonymized preferences;
    obtaining, from the server, the at least one modified image;
    displaying the at least one modified image on a display of the mobile device,
    wherein the mobile device is a phone, a tablet, a laptop, or a wearable processing device, and
    wherein the server is one of multiple servers that logically cooperate as a cloud processing environment delivering in real-time substitute item information based on interactions with the mobile device via a cloud.

2. The method of claim 1, wherein obtaining further includes receiving, from the server, the non-conforming nutrition data or the non-conforming ingredient data.

3. The method of claim 2, wherein displaying further includes displaying the non-conforming nutrition data or the non-conforming ingredient data as a summary on the display to the user.

4. The method of claim 3, wherein displaying further includes providing a user-interface (UI) option for selection by the user to obtain a substitute item that has substitute nutrition data and substitute ingredient data that conforms to the preferences.

5. The method of claim 4, wherein providing further includes obtaining the substitute item from the server when the user selects a user interface option and displaying the substitute item on the display to the user.

6. The method of claim 5, wherein obtaining the substitute item further includes obtaining a manufacturer-provided discount for the substitute item from the server and displaying a link to the manufacturer-provided discount on the display to the user.

7. A system comprising:
    a server comprising a server processor and a server non-transitory computer-readable storage medium;
    the server non-transitory computer-readable storage medium comprising server executable instructions;
    a mobile device comprising a mobile processor and a mobile non-transitory computer-readable storage medium, wherein the mobile device is a phone, a tablet, a laptop, or a wearable processing device;
    the mobile non-transitory computer-readable storage medium comprising mobile executable instructions; and
    the mobile executable instructions when executed by the mobile processor cause the mobile processor to perform first operations comprising:
    obtaining preferences of a user for nutrition data and ingredient data;
    obtaining images captured of nutrition and ingredient labels for items based on operation of the mobile device by the user and a camera of the mobile device, wherein obtaining further includes:
        receiving barcodes scanned from the items and instructing the user to operate the camera of the mobile device while guiding the user to capture quality images for the images of the nutrition and ingredient labels; and
        identifying when the nutrition and ingredient labels are centered within app-displayed guides on a user interface before capturing the quality images either automatically or after user activation of a capture button option presented within the user interface;

anonymizing the preferences as anonymized preferences by removing any user-identifying information from the preferences, wherein an identity of the user is unknown to the server, wherein anonymizing further includes storing the preferences on the mobile device in an encrypted format;

providing the anonymized preferences and the images to the server executable instructions as requests;

displaying at least one modified image that highlight non-conforming nutrition data or non-conforming ingredient data to the user, the at least one modified image received from the server executable instructions;

requesting substitute items from the server executable instructions when the user selects substitute item options based on displaying of the modified images; and displaying substitute items to the user, the substitute items received from the server executable instructions, including links to manufacturer-provided discounts for the substitute items;

wherein obtaining images further includes receiving a barcode scanned from at least one item from the mobile device operated by the user and instructing the user to operate the camera of the mobile device while guiding the user to capture at least one quality image for at least one image of nutrition and ingredient information;

the server executable instructions when executed by the server processor cause the server processor to perform second operations comprising:

performing Optical Character Recognition (OCR) on the images received from the mobile executable instructions;

identifying the non-conforming nutrition data or the non-conforming ingredient data by comparing first text produced from performing the OCR and second text associated with the preferences;

modifying the at least one image producing at least one modified image that highlight the non-conforming nutrition data or the non-conforming ingredient data based on identifying;

providing the at least one modified image to the mobile executable instructions;

obtaining the substitute items for the items when the substitute items are requested by the mobile executable instructions; and providing the substitute items to the mobile executable instructions.

8. The system of claim 7, wherein the mobile executable instructions are integrated into an existing mobile shopping application as an enhancement to the existing mobile shopping application.

* * * * *